United States Patent
Kamachi et al.

(10) Patent No.: US 10,421,156 B2
(45) Date of Patent: Sep. 24, 2019

(54) APPARATUS FOR TREATING RAW-MATERIAL POWDER, APPARATUS FOR TREATING RAW-MATERIAL POWDER, AND METHOD FOR PRODUCING OBJECT

(71) Applicant: CANON KABUSHIKI KAISHA, Tokyo (JP)

(72) Inventors: Koh Kamachi, Kawasaki (JP); Koji Kitani, Chofu (JP)

(73) Assignee: Canon Kabushiki Kaisha, Tokyo (JP)

( * ) Notice: Subject to any disclaimer, the term of this patent is extended or adjusted under 35 U.S.C. 154(b) by 362 days.

(21) Appl. No.: 15/373,216

(22) Filed: Dec. 8, 2016

(65) Prior Publication Data
US 2017/0165791 A1    Jun. 15, 2017

(30) Foreign Application Priority Data
Dec. 10, 2015 (JP) .................... 2015-241005

(51) Int. Cl.
| | |
|---|---|
| B23K 26/342 | (2014.01) |
| B01J 19/08 | (2006.01) |
| B01J 19/12 | (2006.01) |
| B22F 9/08 | (2006.01) |
| B23K 26/12 | (2014.01) |
| B23K 26/70 | (2014.01) |
| B33Y 10/00 | (2015.01) |

(Continued)

(52) U.S. Cl.
CPC ............ *B23K 26/342* (2015.10); *B01J 19/08* (2013.01); *B01J 19/121* (2013.01); *B22F 1/0081* (2013.01); *B22F 1/0088* (2013.01); *B22F 3/1055* (2013.01); *B22F 9/082* (2013.01); *B23K 26/125* (2013.01); *B23K 26/126* (2013.01); *B23K 26/70* (2015.10); *B33Y 10/00* (2014.12); *B33Y 30/00* (2014.12); *B33Y 40/00* (2014.12); *B33Y 80/00* (2014.12); *C01B 33/02* (2013.01); *B01J 2219/0879* (2013.01); *B01J 2219/0894* (2013.01); *B01J 2219/12* (2013.01); *B22F 2003/1056* (2013.01); *B22F 2003/1057* (2013.01); *B22F 2009/0828* (2013.01); *B22F 2301/052* (2013.01); *B22F 2301/205* (2013.01); *B22F 2301/35* (2013.01); *B22F 2302/45* (2013.01); *B22F 2998/10* (2013.01); *B22F 2999/00* (2013.01); *B23K 2103/05* (2018.08); *B23K 2103/10* (2018.08); *B23K 2103/14* (2018.08); *B23K 2103/50* (2018.08); *Y02P 10/295* (2015.11)

(58) Field of Classification Search
None
See application file for complete search history.

(56) References Cited

U.S. PATENT DOCUMENTS

| | | |
|---|---|---|
| 5,182,170 A | 1/1993 | Marcus |
| 2014/0178241 A1 | 6/2014 | Mironets |
| 2014/0370323 A1 | 12/2014 | Ackelid |

FOREIGN PATENT DOCUMENTS

| | | |
|---|---|---|
| CN | 103998209 A | 8/2014 |
| JP | 8-39275 A | 2/1996 |

(Continued)

*Primary Examiner* — Jenny R Wu
(74) *Attorney, Agent, or Firm* — Canon U.S.A., Inc. IP Division

(57) ABSTRACT

A method for treating a raw-material powder includes forming a layer of the raw-material powder and removing oxide film formed on a surface of the raw-material powder from which the layer has been formed.

9 Claims, 5 Drawing Sheets

(51) Int. Cl.
    *B33Y 30/00*    (2015.01)
    *B33Y 80/00*    (2015.01)
    *B33Y 40/00*    (2015.01)
    *C01B 33/02*    (2006.01)
    *B22F 1/00*    (2006.01)
    *B22F 3/105*    (2006.01)
    *B23K 103/04*    (2006.01)
    *B23K 103/10*    (2006.01)
    *B23K 103/14*    (2006.01)
    *B23K 103/00*    (2006.01)

(56) References Cited

FOREIGN PATENT DOCUMENTS

| | | |
|---|---|---|
| JP | 10-88201 A | 4/1998 |
| TW | 200838630 A | 10/2008 |
| TW | 201505820 A | 2/2015 |
| WO | 2014/155352 A2 | 10/2014 |
| WO | 2015/065510 A1 | 5/2015 |

LOWERING

FORMATION

PLASMA TREATMENT

SHAPING WITH BEAM

LOWERING

FORMATION

APPARATUS FOR TREATING RAW-MATERIAL POWDER, APPARATUS FOR TREATING RAW-MATERIAL POWDER, AND METHOD FOR PRODUCING OBJECT

BACKGROUND

Field of the Disclosure

The present disclosure relates to a method and an apparatus for treating a raw-material powder in which the raw-material powder is treated with plasma.

Description of the Related Art

In recent years, fabrication devices that use the powder bed fusion technology (called 3D printers) have been under development. In powder bed fusion, a slice of a raw-material powder is formed, the region of each formed slice to be solidified (hereinafter referred to as the solidifying region) is irradiated with a laser beam or an electron beam (hereinafter referred to as an energy beam) to heat the solidifying region, and such slices are stacked to form a three-dimensional object (Japanese Patent Laid-Open Nos. 8-39275 and 10-88201).

It is generally believed that three-dimensional objects fabricated using powder bed fusion (hereinafter referred to as powder bed fusion products) can be strengthened by increasing the infill by reducing the void volume of the structure. Even in slices in which a spherical raw-material powder is the most closely packed, the interparticle void volume per unit volume exceeds 20%. This means that in the state that is called sintered, in which particles are fused only at the points of contact, there are countless voids between particles.

Japanese Patent Laid-Open No. 8-39275 proposes a powder bed fusion technique in which a three-dimensional object is fabricated through the formation of slices in an atmosphere supplied with an inert gas in an evacuated enclosure and heating of solidifying regions of the slices using a laser beam. Japanese Patent Laid-Open No. 10-88201 states that forming a shaped article from a raw-material powder without use of binder and compressing the raw-material powder before laser-beam powder bed fusion can increase the infill of the three-dimensional object.

The methods according to these publications for fabricating a three-dimensional object were found to fail to increase the infill of powder bed fusion products to sufficiently high levels because these methods leave very small voids in the structure of the finished three-dimensional object. The present disclosure aims to cure these shortcomings.

SUMMARY

A method according to an aspect of the disclosure for treating a raw-material powder includes forming a layer of the raw-material powder and removing oxide film formed on a surface of the raw-material powder from which the layer has been made.

A method according to an aspect of the disclosure for producing an object includes forming a layer of a raw-material powder, removing oxide film formed on a surface of the raw-material powder from which the layer has been made, and shaping with a beam including solidifying, through irradiation with an energy beam, the raw-material powder from which the oxide film has been removed.

An apparatus according to an aspect of the disclosure for treating a raw-material powder includes an evacuable enclosure, an atmosphere generator configured to generate, in the enclosure, an atmosphere containing hydrogen and/or an inert element, a powder container located in the enclosure and electrically insulated from the enclosure, a formation unit configured to form a layer of the raw-material powder in the powder container, and an energizing unit configured to apply a voltage to the layer formed by the formation unit.

According to certain aspects of the disclosure, the amounts of oxides and foreign substances on the surface of a raw-material powder are reduced through plasma treatment of the raw-material powder. This reduces the volume of voids that oxides and foreign substances on the surface of the raw-material powder leave in the structure of the finished three-dimensional object. Certain aspects of the disclosure therefore increase the infill of powder bed fusion products to sufficiently high levels. Furthermore, certain aspects of the disclosure make powder bed fusion products stronger through the use of a raw-material powder treated with plasma.

Further features of the present disclosure will become apparent from the following description of exemplary embodiments with reference to the attached drawings.

DESCRIPTION OF THE EMBODIMENTS

The following describes some embodiments of the disclosure in detail with reference to the attached drawings.

Problems with Known Powder Bed Fusion Techniques

Objects machined out of a metal ingot produced in a melting furnace usually have an infill of 99.9% or more. On the other hand, metal objects fabricated using known powder bed fusion techniques have an infill of at most 99.7% and therefore cannot be as dense as objects machined out of metal ingots. When the intended use is one that requires high surface quality, such as molding dies, objects created using known powder bed fusion techniques are difficult to use directly for that purpose because of their rough surface.

Furthermore, metal objects fabricated using known powder bed fusion techniques have many pores or voids on their surface or in their internal structure. When such known objects are used for construction purposes, which require high tensile and bending strength, concerns arise regarding the growth of cracks or fatigue fractures that originate in the pores on the surface and in the internal structure of the objects.

When used as molding dies, which need to have high surface quality, or for construction purposes, which require high strength, powder bed fusion products may typically have an infill of 99.9% or more. The low infills of objects fabricated using known powder bed fusion techniques, less than 99.7%, combined with the presence of many pores or voids on their surface and in their internal structure have been one of the limiting factors to the widespread use of such objects.

In Embodiment 1, a slice of a raw-material powder is treated with plasma in an argon and hydrogen gas atmosphere, the solidifying region (region to be solidified) of the slice is then immediately heated with a laser beam in the argon and hydrogen gas atmosphere, and such slices are stacked. This provides three-dimensional objects that have an infill of more than 99.9% with a high frequency and high reproducibility compared with known techniques.

This suggests that the low infills observed with known powder bed fusion techniques are attributable to passivation film or dirt existing on the surface of the raw-material powder and that plasma treatment removes them with its physical or chemical effects. Furthermore, the plasma treatment improves the surface wettability of the raw-material powder by increasing surface energy, and this may also contribute by preventing air bubbles from being entrained during fusion.

Embodiment 1

Object Production System

Figure 1:
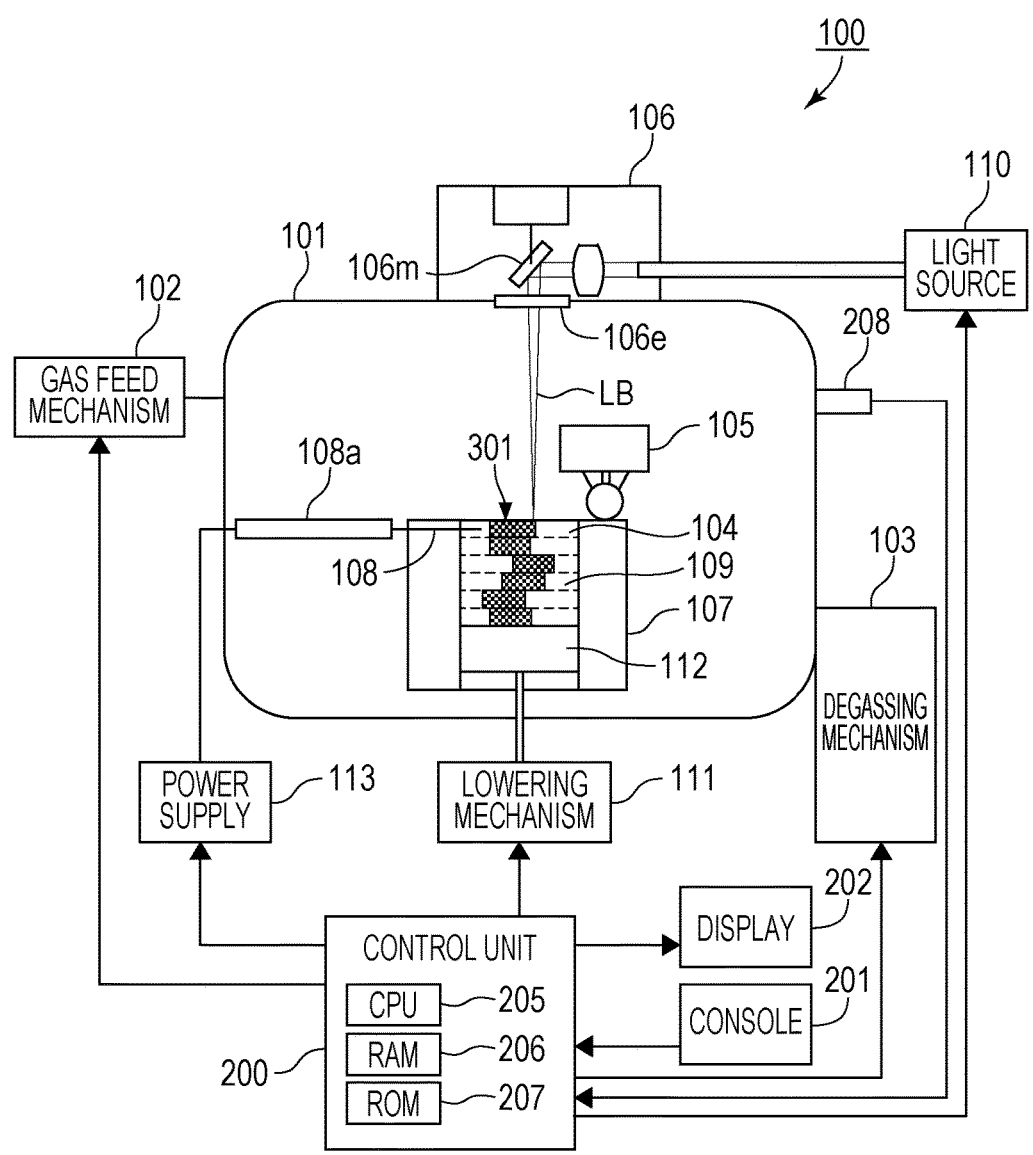
FIG. 1 is an explanatory diagram for the configuration of an object production system, according to one or more embodiments of the subject disclosure.
Figure 2:
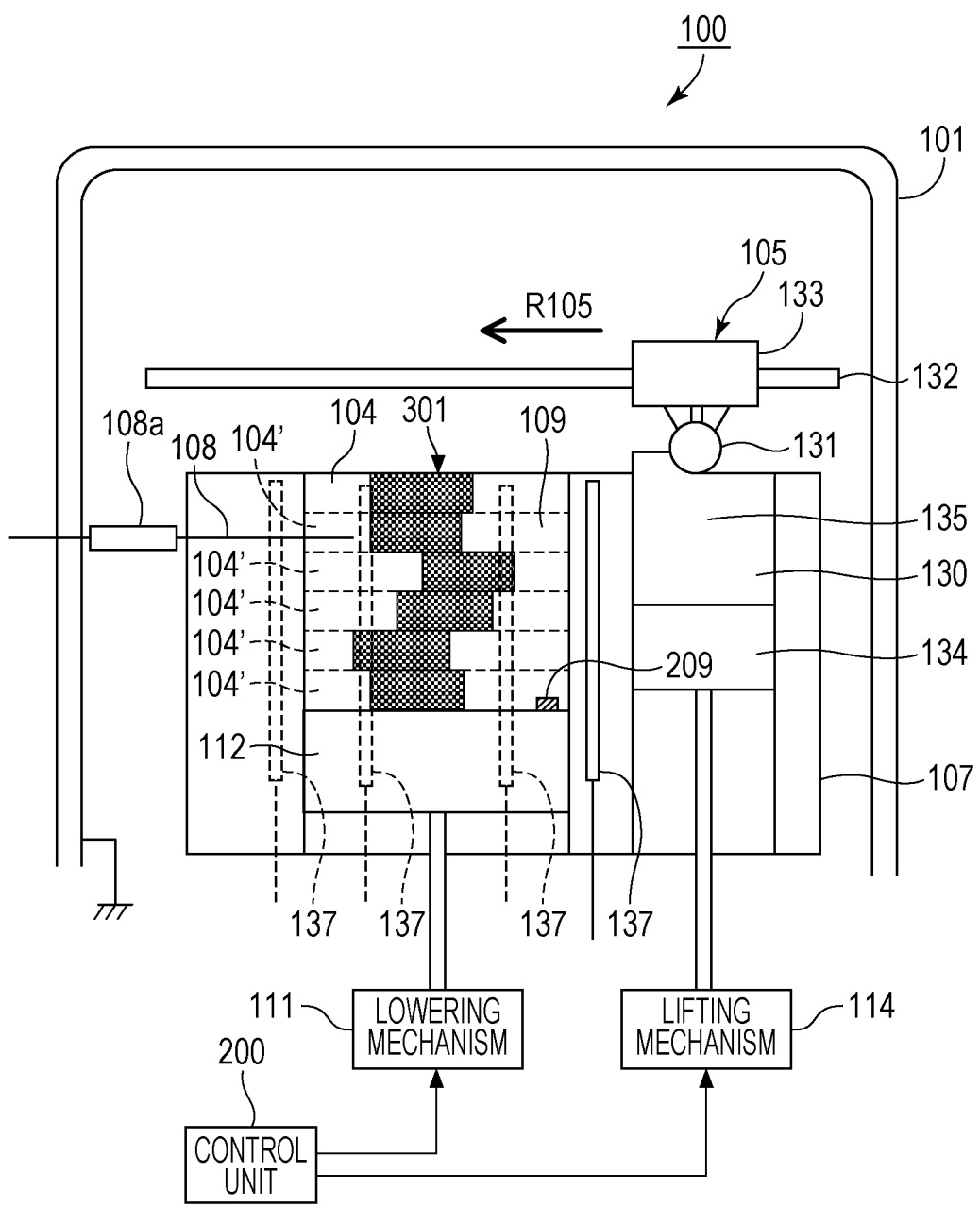
FIG. 2 is an explanatory diagram for the configuration of a construction container, according to one or more embodiments of the subject disclosure.

FIG. 1 is an explanatory diagram for the configuration of an object production system according to Embodiment 1. FIG. 2 is an explanatory diagram for the configuration of a construction container. As illustrated in FIG. 1, the object production system 100 is one that uses the powder bed fusion technology, therefore what is called a 3D printer. The enclosure 101 is made of stainless steel and is capable of preventing the external air from entering its internal space. There is a vacuum gauge 208, an example of a detector, connected to the enclosure 101. The vacuum gauge 208 detects the pressure in the enclosure 101.

The degassing mechanism 103, an example of an evacuator, is capable of reducing the pressure in the enclosure 101. The degassing mechanism 103 removes air out of the enclosure 101, primarily to reduce the amount of oxygen in the atmosphere in the enclosure 101. The degassing mechanism 103 is a series connection of a dry pump and a turbomolecular pump and is capable of evacuating the enclosure 101 to a degree of vacuum of, for example, $1\times10^{-4}$ Pa.

The degassing mechanism 103 also has an orifice-regulating valve at the connection with the enclosure 101 with which the orifice size can be regulated. The control unit 200 controls the atmosphere and the degree of vacuum in the enclosure 101 by operating a gas feed mechanism 102, described hereinbelow, to deliver gases into the enclosure 101 and adjusting this orifice-regulating valve in accordance with the output of the vacuum gauge 208.

The gas feed mechanism 102, an example of a feeder, delivers argon gas, an example of an inert gas, and hydrogen gas into the enclosure 101. The gas feed mechanism 102 is capable of delivering a mixture of argon and hydrogen gases into the enclosure 101 in any proportions of mixing. There may be two separate gas feed mechanisms to deliver argon and hydrogen gases separately.

As illustrated in FIG. 2, the construction container 107, an example of a powder container, has a vertically movable stacking platform 112 inside a construction chamber 109. The lowering mechanism 111 is capable of moving the stacking platform 112 downward in a stepwise manner by any pitch length corresponding to the thickness of the layer 104. In the construction chamber 109, treated layers 104' are stacked as a result of the plasma treatment of each layer 104.

There is in a wall of the construction chamber 109 an embedded resistance heater 137, an example of a heater, capable of heating the layer 104. There is a temperature sensor 209 on the top surface of the stacking platform 112. The control unit 200 turns on and off the flow of electric current into the resistance heater 137 in accordance with the output of the temperature sensor 209 to maintain a constant temperature of the layer 104.

The layer-forming mechanism 105, an example of a formation unit, forms a layer 104 of the raw-material powder in the construction chamber 109 of the construction container 107 located in the enclosure 101. The layer of the raw-material powder formed by the layer-forming mechanism 105 is very thin, having a thickness of 5 µm or more and 200 µm or less. The layer 104 of the raw-material powder is thus herein referred to as the slice.

The slice-forming mechanism 105 has a moving unit 133 that moves, as guided by a guide 132, in the direction of the arrow R105 along the top surface of the construction container 107. The raw-material powder 135 is stored in a raw-material reservoir 130 and raised to a level higher than the top surface of the construction container 107 through a lift of a baseplate 134. The slice-forming mechanism 105 strikes off the raw-material powder that has emerged on the top surface of the construction container 107 while rotating its metal roller 131 in the counter direction with respect to the top surface of the construction container 107, thereby forming the slice 104 of the raw-material powder 135 in a uniform thickness and a dense structure on the top surface of the stacking platform 112. The slice-forming mechanism 105 also forms a new slice 104 of the raw-material powder on treated slice(s) 104', each of which is a slice 104 formed in the construction chamber 109 and treated with plasma.

Construction Container

The raw-material powder, even if its inside is metal, usually is of low conductivity between its particles because its surface is covered with passivation film such as oxide film. It has thus been generally believed that plasma treatment of the raw-material powder through exposure to a plasma arc requires applying an AC voltage to a plate electrode facing the slice 104. A plate electrode placed above the slice 104, however, blocks the optical path through which the slice 104 is irradiated with a laser beam and collides with the slice-forming mechanism 105 moving along the top surface of the construction container 107. It has thus generally been believed that a plate electrode placed above the slice 104 requires a retraction mechanism that physically retracts the plate electrode from above the slice 104.

The object production system 100, however, repeats forming a slice 104 and treating it with plasma as many as several hundreds to thousands of times even when constructing an object with a thickness of several tens of millimeters as described hereinafter. Retracting a plate electrode from above the slice 104 each time when a slice 104 is formed would therefore lead to a great loss of time. There would also be the problems of falling contaminants associated with the retraction of the plate electrode and faults in the retraction mechanism.

The inventors developed a mode of plasma discharge for the plasma treatment of the slice 104 formed in the construction container 107 that uses no plate electrode above the slice 104. The inventor first found that applying an AC voltage to the slice 104 in an electrically floating state with respect to components such as the supporting structure for the enclosure 101 and the construction container 107 produces a uniform plasma arc across the surface area of the slice 104. The inventor further developed this into a mode of plasma discharge in which the enclosure 101 is grounded, the construction container 107 is electrically isolated from the enclosure 101, and an AC voltage is applied to an electrode 108 in contact with the slice 104. Such a mode of plasma discharge can be performed without a plate electrode facing the slice 104 because the slice 104 itself serves as a discharge electrode.

As illustrated in FIG. 1, the construction container 107 is located in the enclosure 101, which is grounded, and is electrically isolated from the enclosure 101. The construction container 107 and the stacking platform 112 are made of insulating materials to avoid plasma formation on their surfaces. The surfaces of the construction container 107 that come into contact with the slice 104 are insulating. The electrode 108 (energizing unit) that supplies the slice 104 of the raw-material powder with a voltage that comes from a power supply 113 has an insulating cover 108a to avoid plasma formation on its surface.

In Embodiment 1, the slice 104 formed in the construction chamber 109 of the insulating construction container 107 is electrically isolated from the enclosure 101, and the electrode 108 is used to apply an AC voltage to the slice 104. With the construction container 107 holding the slice 104 and electrically isolated from the enclosure 101, an AC voltage is applied to the electrode 108 lying in contact with the slice 104. With such a configuration, it is possible in Embodiment 1 to generate uniform plasma across the surface area of the slice 104 and rapidly perform a uniform plasma treatment of the raw-material powder for the slice 104 without needing a plate electrode or any similar component.

Plasma Treatment

As illustrated in FIG. 1, the object production system 100 generates plasma in the space next to the slice 104 of the raw-material powder formed in the construction container 107 by applying an AC voltage to the slice 104. The object production system 100 performs the plasma treatment of a slice 104 formed as a first layer on the stacking platform 112, and carries out the plasma treatment of slices 104 formed on the treated slice 104' as second and subsequent layers.

The power supply 113, an example of an energizing unit, and the electrode 108 apply an AC voltage to the slice 104. The power supply 113 applies the AC voltage to the slice 104 of the raw-material powder via the electrode 108. As illustrated in FIG. 2, the electrode 108 lies in contact with the slice 104 or treated slice 104' in the construction container 107. The power supply 113 is also capable of produce a DC voltage or an AC voltage superposed with a DC voltage. Multiple DC voltages can be selected from the range of −500 V to +500 V. For the AC voltage, multiple amplitudes and multiple frequencies can be selected from the ranges of 0 to 2000 V and 10 kHz to 500 kHz, respectively.

The control unit 200 operates the power supply 113, with the enclosure 101 fed with hydrogen and/or inert gases and its degree of vacuum being 10 Pa or more and less than 10 kPa. This ensures localized formation of plasma in the space next to the slice 104, providing efficient exposure of the raw-material powder for the slice 104 to plasma and rapid plasma treatment of the raw-material powder.

During the plasma treatment, the raw-material powder is held in a plasma that contains hydrogen ions and/or ions of argon, an example of an inert gas, and free electrons. The plasma treatment that uses argon ions and free electrons is intended to provide the effect called sputter cleaning. The argon ions collide with the surfaces of the particles of the raw-material powder and sweep away the adhering oxide film or foreign substances. The free electrons also collide with the surfaces of the particles of the raw-material powder, and the surfaces heated to high temperatures evaporate away the adhering oxide film or foreign substances. As a result, the material for the raw-material powder becomes exposed from under covers of foreign substances.

On the other hand, the plasma treatment that uses hydrogen ions is primarily aimed at removing passivation film on the surfaces of the particles of the raw-material powder through chemical reduction. This gives the raw-material powder deoxidized and highly crystallizable particle surfaces, ensuring that the particles of the raw-material powder fuse even at relatively low temperatures and helping them form crystals with few crystal lattice irregularities.

As illustrated in FIG. 2, the resistance heater 137 may be energized during the plasma treatment to additionally heat the slice 104 of the raw-material powder on the stacking platform 112 to make the plasma treatment more efficient. The laser beam LB may be used as an additional heat source instead of the resistance heater 137 or in combination with the resistance heater 137. More specifically, it is possible to heat the slice 104 without melting it by traversing the laser beam LB at reduced intensity or across a broader spot area.

Laser Thermoforming

As illustrated in FIG. 1, the scanning heating mechanism 106 optionally includes optical elements such as a condensing lens and a collimator lens. The light source 110 is a YAG laser oscillator with a power of 500 W. The scanning heating mechanism 106 moves a laser beam generated at the light source 110 using a galvanometer mirror 106m to scan the solidifying region of the treated slice 104' to heat this region with a beam spot of the laser beam LB.

The design data for the three-dimensional object generated using 3D CAD software is processed on 2D CAM software into two-dimensional slice data for multiple solidifying regions the intervals between which correspond to the thickness of the slice 104. The NC program for the scanning heating mechanism 106 converts the two-dimensional data for the specific solidifying regions into scanning programs for the solidifying region of each slice 104 that control simultaneous relative movements in two horizontal directions. The control unit 200 controls the scanning heating mechanism 106 as directed by the scanning programs for each solidifying region to scan predetermined paths on the plane of the construction container 107 with a laser beam LB.

The scanning heating mechanism 106, an example of a beam emitter, irradiates the treated slice 104', or the slice 104 treated with plasma, with a laser beam LB, an example of an energy beam. The treated slice 104', forming the top surface of the construction chamber 109 of the construction container 107, is heated by a laser beam emitted from the scanning heating mechanism 106. The laser beam melts the treated slice 104' and solidifies it with the lower solid structure almost in a moment. As a result, a region of the treated slice 104' as the top surface of the construction chamber 109 is melted and solidified. The plasma treatment and the energization of the resistance heater 137 may continue during this laser thermoforming phase so that the treated slice 104' remains at a high temperature. Maintaining the treated slice 104' at a high temperature leads to more efficient laser thermoforming and therefore enables rapid laser thermoforming even when the power of the laser beam is low and, furthermore, gives the resulting object 301 a more uniform structure by ensuring that the treated slices 104' are melted in a more consistent manner.

Note that heating with a laser beam in this phase of laser thermoforming can be used to promote the plasma treatment of the raw-material powder for the treated slice 104'. The plasma treatment of the raw-material powder therefore does not need to be 100% completed in the above phase of plasma treatment. For example, it is possible to suspend the treatment at a roughly 80% progression in the phase of plasma treatment and achieve 100% of the intended level of treatment in the phase of laser thermoforming before melting the raw-material powder. This accelerates the production of the object 301 by reducing the time required for plasma treatment.

Process for the Production of an Object

Figure 3:
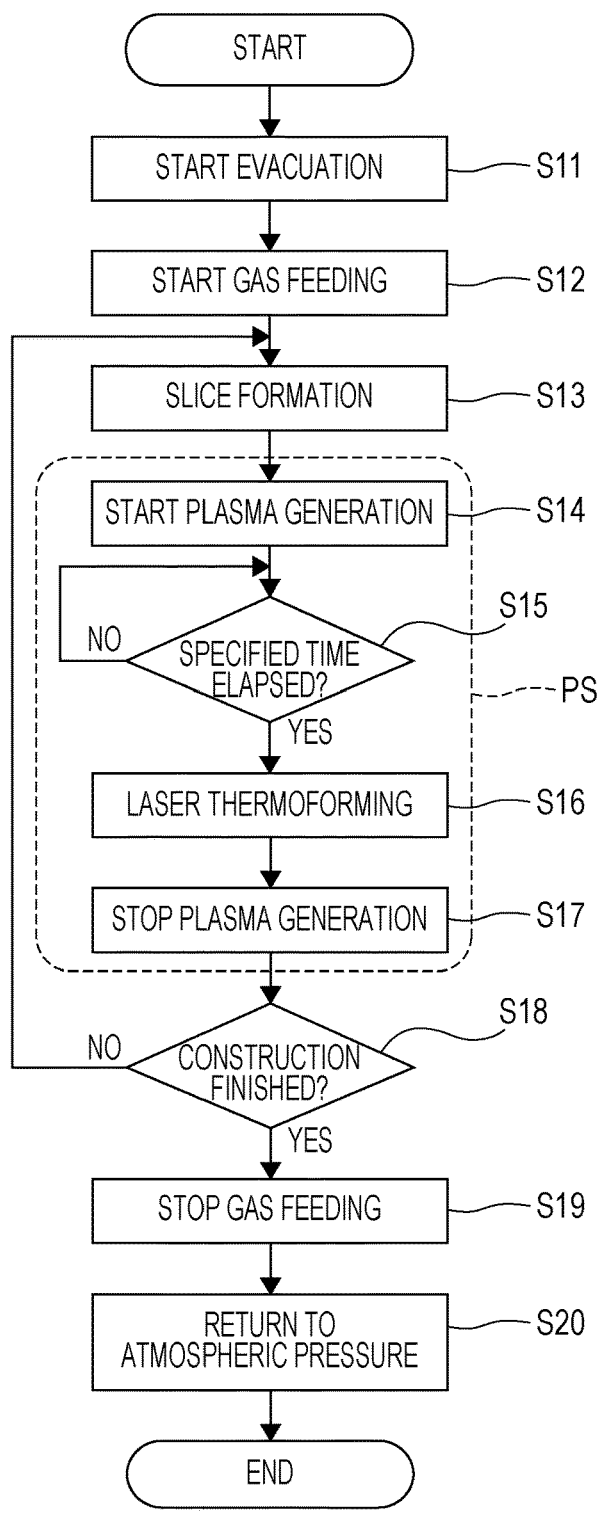
FIG. 3 is a flowchart for a process for the production of an object, according to one or more embodiments of the subject disclosure.

FIG. 3 is a flowchart for a process for the production of an object. FIGS. 4A to 4F are explanatory diagrams for a stacking phase performed with an object production system. As illustrated in FIG. 1, the control unit 200 has a CPU 205, a RAM 206, and a ROM 207. By storing process control programs called from the ROM 207 in the RAM 206, the CPU 205 functions as a process controller for the object production system 100. The user instructs the system to start the process via the console 201.

As illustrated in FIG. 3, in response to the process startup command, the control unit 200 operates the degassing mechanism 103 to evacuate the enclosure 101 (S11). After the pressure in the enclosure 101 has reached $1 \times 10^{-2}$ Pa, the gas feed mechanism 102 is operated to start gas feeding and adjust the pressure in the enclosure 101 to a sub-atmospheric process pressure (S12). In the atmosphere generation phase composed of steps S11 and S12, as illustrated in FIG. 1, the enclosure 101 is evacuated to a first pressure, and then argon and hydrogen gases are delivered into the enclosure 101 to create, in the enclosure 101, an atmosphere of a second pressure that is higher than the first pressure and lower than atmospheric pressure.

Figure 4A:
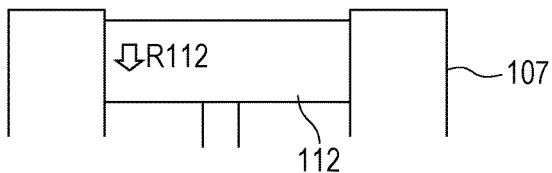
FIGS. 4A to 4F are explanatory diagrams for a stacking phase performed with an object production system, according to one or more embodiments of the subject disclosure.
Figure 4B:
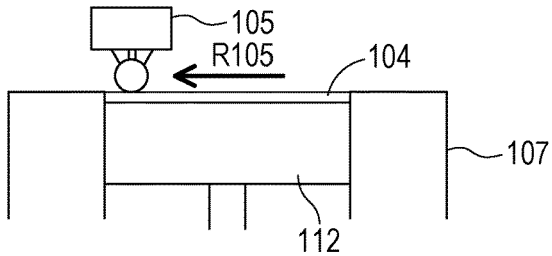

As illustrated in FIG. 3, after the pressure in the enclosure 101 has reached the second pressure (e.g., 5 kPa), the control unit 200 operates the slice-forming mechanism 105 to form a slice 104 of the raw-material powder (S13). As illustrated in FIG. 4A, in the lowering phase, the lowering mechanism 111 is operated to lower the stacking platform 112 to make a space inside the construction container 107 for the slice 104 to be formed in. As illustrated in FIG. 4B, in this formation phase, or in step S13, the slice-forming mechanism 105 is operated to form a slice 104 of the raw-material powder on the stacking platform 112.

Figure 4C:
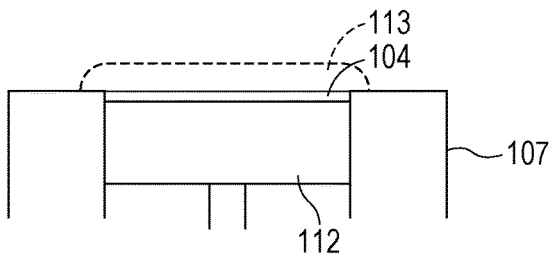

As illustrated in FIG. 3, the control unit 200 operates the power supply 113 to start plasma generation (S14) and continues the plasma treatment of the slice 104 until a specified time elapses (NO in S15). As illustrated in FIG. 4C, in this plasma treatment phase composed of steps S14 and S15, the slice 104 of the raw-material powder on the stacking platform 112 is treated with plasma. In the plasma treatment phase plasma is generated in a low-oxygen atmosphere containing argon and hydrogen gases through the application of an AC voltage to the slice 104 with the power supply 113. The plasma treatment phase is performed in an atmosphere of a sub-atmospheric pressure (preferably 10 Pa or more and less than 10 kPa) generated in the enclosure 101. The plasma treatment phase is carried out while maintaining a constant temperature of the slice 104 by heating the slice 104 using the resistance heater 137.

Figure 4D:
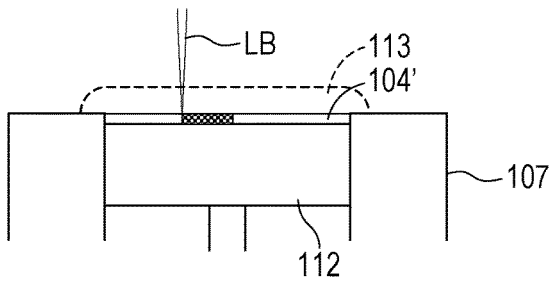

As illustrated in FIG. 3, after the completion of the plasma treatment PN of the slice 104 (YES in S15), the control unit 200 controls the scanning heating mechanism 106 and the light source 110 to perform the laser thermoforming of the treated slice 104' (S16). In this phase of shaping with a beam, or in step S16, the scanning heating mechanism 106 and the light source 110 are operated to perform laser thermoforming to melt and solidify the treated slice 104' on the stacking platform 112 as illustrated in FIG. 4D. In the phase of shaping with a beam the solidifying region of the treated slice 104' is irradiated with an energy beam for solidification. The phase of shaping with a beam is performed while plasma is generated in a low-oxygen atmosphere containing argon and hydrogen gases through the application of an AC voltage to the treated slice 104'.

Figure 4E:
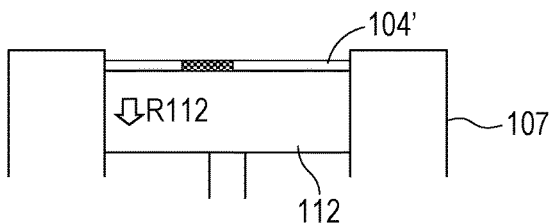
Figure 4F:
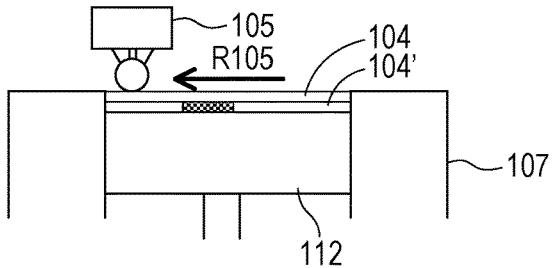

As illustrated in FIG. 3, after the completion of the laser thermoforming of one treated slice 104' (S16), the control unit 200 turns off the power supply 113 to stop the plasma generation PS on the treated slice 104' (S17). The control unit 200 repeats the formation of a slice (S13), plasma treatment (S14 and S15), laser thermoforming (S16), and stopping plasma generation (S17) until reaching the stacking count (number of layers stacked) for the completion of the object 301 (NO in S18). In the second lowering phase, the lowering mechanism 111 is operated to lower the stacking platform 112 to make a space on the entire treated slice 104', including the unsolidified portion, for a new slice 104 of the raw-material powder to be formed in as illustrated in FIG. 4E. In the second formation phase, the slice-forming mechanism 105 is operated to form the second slice 104 of the raw-material powder as illustrated in FIG. 4F. The new slice 104 is formed on the treated slice 104' on the bottom surface of the construction container 107.

As illustrated in FIG. 3, the object production system 100 repeats the formation of a slice, plasma treatment, and laser thermoforming to construct a three-dimensional object 301 as a stack of the solidifying regions of treated slices 104'. After reaching the stacking count for the completion of the object 301 (YES in S18), the control unit 200 stops gas feeding (S19) and introduces the outside air into the enclosure 101 (S20). Then the control unit 200 tells the user via the display 202 that the object (shaped article) 301 is ready to be taken out.

Making Objects from Different Materials

Using this object production system 100, some objects 301 were fabricated with different materials for the raw-material powder, different plasma treatment conditions, and different laser thermoforming conditions as in Examples 1, 2, and 3. The resulting objects 301 were tested for density.

Example 1

In Example 1, a raw-material stainless steel powder was subjected to plasma treatment/laser thermoforming under the following conditions.

Plasma Treatment Conditions
    Pressure in the enclosure 101: 6.66 kPa
    Feed gas: Argon gas
    Raw-material powder: A water-atomized raw-material SUS613 powder having a particle diameter of 7 μm
    Thickness of the slice 104: 20 μm
    Voltage applied: AC voltage 1 kV, frequency 100 kHz
    Duration of treatment: 1 minute Laser Thermoforming Conditions
    Region melted: A square region measuring 25 mm wide and 25 mm long on the slice 104
    Stacking count: 5000
    Stacking height: 100 mm The infill of the object 301 obtained in Example 1 as measured by the Archimedes method was 99.9% or more. Through this it was found that the conditions used in Example 1 provide objects 301 more dense than stainless steel objects fabricated using the ordinary powder sintering method.

Example 2

In Example 2, a raw-material titanium powder was subjected to plasma treatment/laser thermoforming under the following conditions.
Plasma Treatment Conditions
  Pressure in the enclosure 101: 13.3 Pa
  Feed gas: A mixed gas containing 50% argon gas+50% hydrogen gas (% by the number of molecules)
  Raw-material powder: A water-atomized raw-material Ti powder having a particle diameter of 50 μm
    Thickness of the slice 104: 100 μm
    Voltage applied: AC voltage 20 kV, frequency 7 kHz
    Duration of treatment: 3 minutes
  The powder container 107 was preheated using the resistance heater 137 and controlled to maintain the slice 104 and the object 301 at 400° C. to accelerate the hydrogen reduction of passivation film.
Laser Thermoforming Conditions
  Region melted: A square region measuring 25 mm wide and 25 mm long on the slice 104
    Stacking count: 500
    Stacking height: 50 mm
  The infill of the object 301 obtained in Example 2 as measured by the Archimedes method was 99.9% or more. Through this it was found that the conditions used in Example 2 provide objects 301 more dense than titanium objects fabricated using the ordinary powder sintering method.

Example 3

In Example 3, a raw-material aluminum powder was subjected to plasma treatment/laser thermoforming under the following conditions.
Plasma Treatment Conditions
  Pressure in the enclosure 101: 1.0 kPa
  Feed gas: 100% hydrogen gas
  Raw-material powder: A gas-atomized raw-material Al powder having a particle diameter of 80 μm
    Thickness of the slice 104: 100 μm
    Voltage applied: AC voltage 1.5 kV, frequency 100 kHz
    Duration of treatment: 3 minutes
  The powder container 107 was preheated using the resistance heater 137 and controlled to maintain the slice 104 and the object 301 at 400° C. to accelerate the hydrogen reduction of passivation film.
Laser Thermoforming Conditions
  Region melted: A square region measuring 5 mm wide and 5 mm long on the slice 104
    Stacking count: 50
    Stacking height: 5 mm
  The infill of the object 301 obtained in Example 3 as measured by the Archimedes method was 99.9% or more. The object oxygen level as measured by thermal fusion was less than 0.1%. Through this it was found that the conditions used in Example 3 provide objects 301 more dense and purer than aluminum objects fabricated using the ordinary powder sintering method.

Advantages of Embodiment 1

In Embodiment 1, the plasma treatment of the raw-material powder for the slice 104 is performed in a low-oxygen atmosphere, and this prevents the oxidization of the raw-material powder through which passivation film is formed. Furthermore, the atmosphere in which the raw-material powder for the slice 104 is subjected to plasma treatment contains argon. The argon ions and electrons collide with the surface of the raw-material powder and remove and heat the adhering foreign substances, leaving highly crystalline surfaces. The atmosphere for the plasma treatment of the raw-material powder for the slice 104 also contains hydrogen, and this accelerates the hydrogen reduction of the oxide film existing on the surface of the raw-material powder through which passivation film is eliminated. In this way, this embodiment solves the infill issue with powder bed fusion and enables the construction of objects with higher density, for example an infill of 99.9% or more, superior surface characteristics, and higher strength.

In Embodiment 1, the plasma is generated at the surface of the slice 104 interfacing with the gas in the atmosphere, through the application of an AC voltage to the slice 104. When the electrode 108 comes into contact with and applies an AC voltage to the slice 104 or treated slice 104' in the construction container 107, the slice 104 behaves as a discharge electrode. No electrode for applying an AC voltage is needed above the slice 104. No component that assists discharge, such as a plate electrode or a coil, is needed above the slice 104. There remains plenty of space above the slice 104 in which nothing interferes with the irradiation of the slice 104 with a laser beam LB and the formation of the slice 104 by the slice-forming mechanism 105.

In Embodiment 1, the construction container 107 in which the slice 104 is subjected to an AC voltage is made of an insulating material. This ensures localized formation of plasma on the surface of the slice 104 interfacing with the gas in the atmosphere with no plasma occurring on the construction container 107. The localized formation of plasma on this surface of the slice 104 leads to highly uniform plasma treatment across the entire surface of the slice 104. The argon and hydrogen ions in the plasma strike the slice 104 in an efficient manner and rapidly remove materials covering the surface of the raw-material powder such as oxides, passivation film, and dirt. As a result, the plasma treatment in this embodiment is rapid and highly efficient.

In Embodiment 1, the formed slice 104 of the raw-material powder is subjected directly to the plasma treatment. The treated slice 104' can therefore be obtained with any intended level of treatment by extending the duration of plasma generation. It is possible to precisely control the level of plasma treatment of the treated slice 104' by adjusting the duration of plasma generation.

In Embodiment 1, the plasma treatment is performed in an atmosphere of a sub-atmospheric pressure generated in the enclosure 101. The plasma therefore remains in a stable state compared with that in a plasma treatment performed in an atmosphere of atmospheric or higher pressure.

In Embodiment 1, the plasma treatment is performed in an atmosphere of a pressure of 10 Pa or more and less than 10 kPa generated in the enclosure 101. The plasma treatment of the raw-material powder is therefore faster than it would be at lower degrees of vacuum.

In Embodiment 1, the enclosure 101 is evacuated to a first pressure, and then an inert element is delivered into the enclosure 101 to create an atmosphere of a second pressure that is higher than the first pressure and lower than atmospheric pressure. Much oxygen has therefore been removed from the atmosphere in which the plasma is generated, and this prevents the atmosphere during the plasma treatment from being contaminated by contaminants contained in the raw-material powder such as oxygen, organic substances, and water.

In Embodiment 1, the construction container 107 in which the slice 104 is formed and treated with plasma is electrically isolated from the enclosure 101. Thus little current leaks when the slice 104 is subjected to an AC voltage, and the consequent localization of plasma on the surface of the slice 104 interfacing with the gas in the atmosphere leads to efficient plasma treatment.

In Embodiment 1, the plasma treatment is performed while the slice 104 is heated using a heater to maintain a constant temperature of the slice 104. This leads to faster plasma treatment by elevating the temperature of the raw-material powder and ensures more consistent levels of treatment of the raw-material powder for all layers stacked, from the first to the last.

In Embodiment 1, the raw-material powder is metal particles formed by water atomization. The raw-material cost is therefore lower than with the use of metal particles formed using gas atomization. In general, metal particles formed by water atomization are covered with thick passivation film. In this embodiment, however, the passivation film is eliminated through reaction with hydrogen ions in the plasma state, and this makes the plasma treatment of the raw-material powder efficient.

In Embodiment 1, the solidifying region of the treated slice 104' is irradiated with a laser beam LB for solidification. The laser beam, unlike an electron beam, is not attenuated or scattered even when the inside of the enclosure 101 is not a high degree of vacuum. It is therefore possible to heat the treated slice 104' in an efficient manner even at a low degree of vacuum of 10 Pa or more and less than 10 kPa.

In Embodiment 1, the plasma-treated slice 104' immediately proceeds to laser thermoforming without being exposed to the outside air. The plasma treatment continues during the laser thermoforming. Most of oxides and foreign substances have therefore been removed from the surface of the raw-material powder at the time of laser thermoforming, allowing efficient powder bed fusion.

Crystal Structure of the Object

In Embodiment 1, crystals repeatedly grow upward on the core crystals therebeneath to form an object 301 in the same way as in the growth of single crystals in the method called zone melting. The object 301, composed of solid layers each formed through plasma treatment of a slice 104 of the raw-material powder and subsequent melting and solidification of the treated slice 104' with a laser beam LB, therefore has a crystal structure in which crystals have grown in parallel in the direction from the planes on the first layer side to the planes on the last layer side. Furthermore, the object 301 is free of oxides and foreign substances inside as well as on its surface.

As mentioned above, in Embodiment 1, the infill of the object 301 as measured by the Archimedes method is 99.9% or more. There has hitherto been no technology that solidifies a metal powder to such a high infill. One reason for the high infill is that the plasma treatment removes oxides and foreign substances from the raw-material powder in a highly efficient manner. Another reason is that the moderate degree of vacuum in the enclosure 101 allows a sufficient amount of argon ions to be saved for the plasma treatment. Treating a finished object 301 with plasma, for example, would leave large amounts of oxides and foreign substances inside because the argon ions in the plasma would only strike the surface of the object 301 without reaching the inside of the object 301. Plasma treatment of each slice, if insufficient, would also leave oxides and foreign substances inside the object 301. In Embodiment 1, each slice is treated with plasma in a specific plasma atmosphere, and this ensures that the inside of the slice is treated with the plasma as well as the surface. The resulting object 301 has few voids associated with oxides and foreign substances even inside.

Embodiment 2

The examples in Embodiment 1 were ones in which alloy (stainless steel) and pure metal (titanium) objects were produced. In Embodiment 2, examples are described in which nitrided alloy (stainless steel) and carburized metal (silicon) objects were produced using the object production system 100 illustrated in FIG. 1.

Example 4

As illustrated in FIG. 1, feeding a nitrogen-containing substance via the gas feed mechanism 102 during the plasma treatment in the object production system 100 initiates plasma nitriding, a reaction through which nitrogen ions generated in the plasma are taken in the raw-material powder. Nitrogen ions accelerated in the plasma enter and diffuse through the surface of the raw-material powder that has been heated, cleaned, and activated in the plasma into the inside.

In Example 4, hydrogen gas as a hydrogen-containing substance and nitrogen gas as a nitrogen-containing substance were fed via the gas feed mechanism 102. Operating the object production system 100 in the same way as in Embodiment 1 in this state initiated plasma nitriding of the raw-material powder instead of plasma treatment. As in Embodiment 1, laser thermoforming followed the plasma treatment (plasma nitriding) of the raw-material powder to shape the nitrided powder material into a three-dimensional object.

As illustrated in FIG. 3, the plasma treatment of the raw-material powder (S14 and S15) and the laser thermoforming of a slice (S16 and S17) were repeated in a mixed atmosphere containing hydrogen and nitrogen gases to construct an object 301. In Example 4, stainless steel particles were subjected to plasma nitriding/laser thermoforming under the following conditions.

Plasma Nitriding Conditions
  Pressure in the enclosure 101: 13.3 kPa
  Feed gas: A mixed gas containing nitrogen and hydrogen gases in a gas mixing ratio of 1:1
  Raw-material powder: Water-atomized stainless steel (SUS613) particles having a particle diameter of 7 μm
  Thickness of the slice 104: 20 μm
  Voltage conditions: AC voltage 1 kV, frequency 100 kHz
  Duration of treatment: 3 minutes Laser Thermoforming Conditions
  Region melted: A square region measuring 25 mm wide and 25 mm long on the treated slice (nitrided slice)
  Stacking count: 2000
  Height of the object 301: 40 mm The object 301 obtained in Example 4 was analyzed for nitrogen concentration using XPS (x-ray photoelectron spectroscopy), with the result that the nitrogen concentration was 12% (percentage by the number of atoms). The infill of the object 301 as measured by the Archimedes method was 99.9%. The hardness of the object 301 as measured using a Vickers hardness tester was HV 2200.

Example 5

Feeding a carbon-containing substance via the gas feed mechanism 102 during the plasma treatment in the object production system 100 illustrated in FIG. 1 initiated plasma carburizing, a reaction through which carbon ions generated in the plasma were taken in the raw-material powder. Carbon ions accelerated in the plasma entered and diffused through the surface of the raw-material powder that had been heated, cleaned, and activated in the plasma into the inside.

In Example 5, hydrogen gas as a hydrogen-containing substance, argon gas as a substance containing an inert gas, and methane gas as a carbon-containing substance were fed via the gas feed mechanism 102. Operating the object production system 100 in the same way as in Embodiment 1 in this state initiated plasma carburizing of the raw-material powder instead of plasma treatment. As in Embodiment 1, laser thermoforming followed the plasma treatment (plasma carburizing) of the raw-material powder to shape the carburized powder material into a three-dimensional object.

As illustrated in FIG. 3, the plasma treatment of the raw-material powder (S14 and S15) and the laser thermoforming of a slice (S16 and S17) were repeated in a mixed atmosphere containing hydrogen, argon, and methane gases to construct an object 301. In Example 5, a raw-material silicon powder was subjected to plasma carburizing/laser thermoforming under the following conditions.

Plasma Carburizing Conditions
  Pressure in the enclosure: 13.3 kPa
  Feed gas: A mixed gas containing methane, hydrogen, and argon gases in a gas mixing ratio of 1:2:1
  Raw-material powder: A water-atomized raw-material silicon powder having a particle diameter of 5 μm
    Thickness of the slice: 40 μm
    Voltage conditions: AC voltage 20 kV, frequency 100 kHz
    Duration of treatment per layer: 5 minutes
Laser Thermoforming Conditions
  Region melted: A square region measuring 25 mm wide and 25 mm long on the treated slice (carburized slice)
    Stacking count: 100
    Stacking height: 4 mm In Example 5, heating was performed throughout the plasma carburization/laser thermoforming phases using the resistance heater 137 to maintain the temperature of the slice 104 and the object 301 at 800° C. Maintaining the slice 104 and the object 301 at a high temperature made the reaction between carbon and silicon even faster. In Example 5, the plasma carburization continued while the treated slice 104' was irradiated with a laser beam for laser thermoforming. This ensured that not only the slice 104 but also the object 301 continued to be doped with the element carbon.

The object 301 obtained in Example 5 was analyzed for carbon concentration using an XPS (x-ray photoelectron spectroscopy) instrument, with the result that the carbon concentration was 11% (percentage by the number of atoms). The infill of the object 301 as measured by the Archimedes method was 99.2%. The hardness of the object 301 as measured using a Vickers hardness tester was HV 3000.

Embodiment 3

Figure 5:
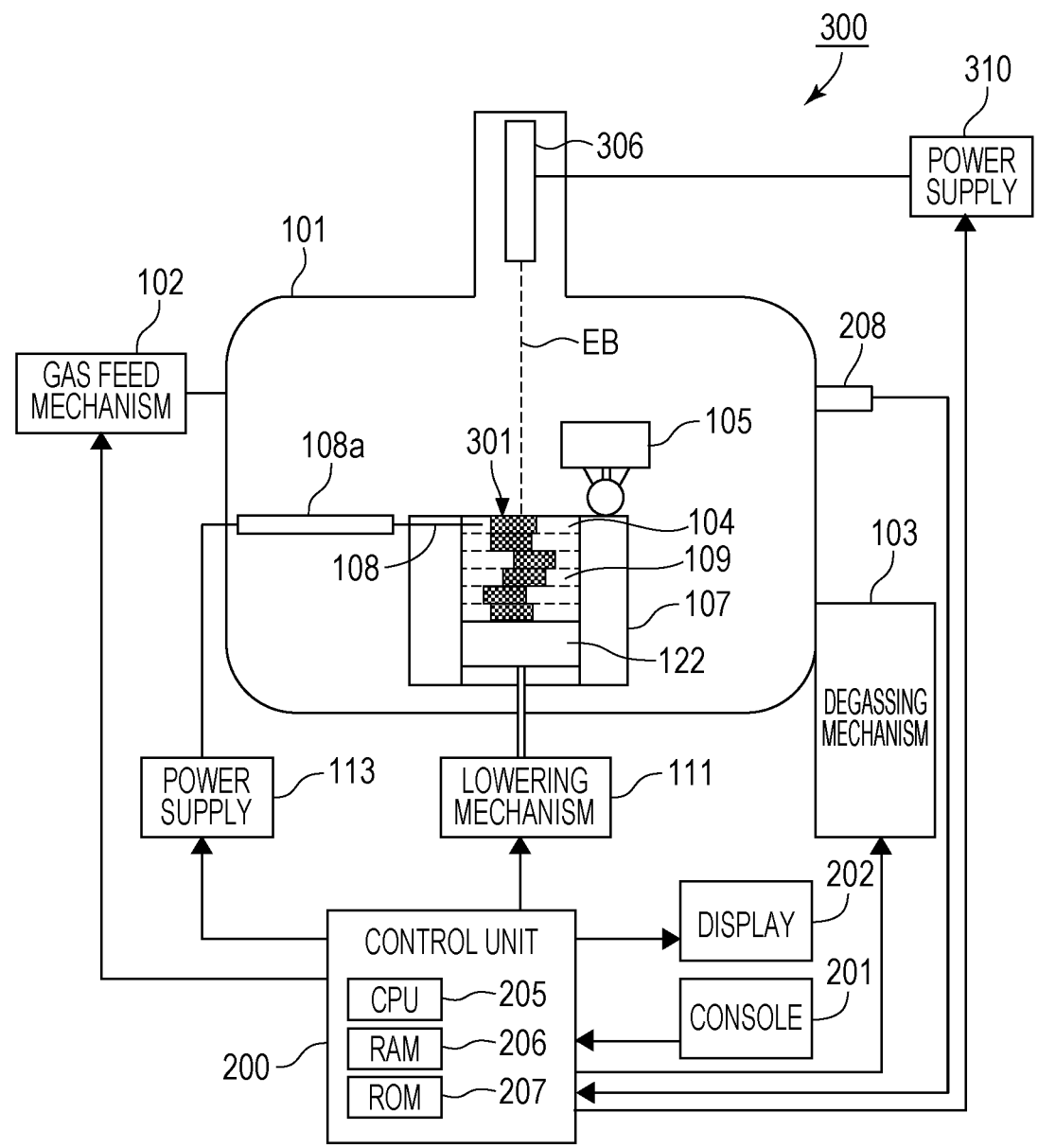
FIG. 5 is an explanatory diagram for the configuration of an object production system, according to one or more embodiments of the subject disclosure.

In Embodiment 1, laser thermoforming was used to melt and solidify treated slices. In Embodiment 3, electron beam thermoforming is used to melt and solidify treated slices.
Object Production System FIG. 5 is an explanatory diagram for the configuration of an object production system according to Embodiment 3. As illustrated in FIG. 5, an object production system according to Embodiment 3 uses an electron beam instead of a laser beam to thermoform each treated slice but has the same configuration and conducts the same plasma treatment/thermoforming phases as one according to Embodiment 1 except for this. Any components in FIG. 5 equivalent to those in Embodiment 1 are given the same reference numerals as in FIG. 1 and are not described in detail hereinbelow.

The object production system 300 is one that uses the powder bed fusion technology, therefore what is called a 3D printer. The degassing mechanism 103 evacuates the enclosure 101. The gas feed mechanism 102 delivers gases into the enclosure 101. The object production system 300 can also be used as a raw-material powder treatment system, i.e., a system that only treats a raw-material powder with plasma and produces a treated powder, as in Embodiment 1.

The electron beam heating device (device that performs heating using an electron beam) 306 generates and traverses an electron beam to heat the solidifying region of the slice 104 with a spot of the electron beam in accordance with input data. The electron beam control unit 310 is a controller that controls the generation and traversing of an electron beam by the electron beam heating device 306. Degree of Vacuum in Electron Beam Thermoforming The object production system 300 according to Embodiment 3 may need to have a degree of vacuum of $10^{-1}$ Pa or less inside the enclosure 101 during the electron thermoforming phase because the electron beam is scattered by gas molecules existing in the enclosure 101. For this purpose, the object production system 300 according to Embodiment 3 first performs the plasma treatment while maintaining a degree of vacuum of 100 Pa by feeding a mixed gas containing carbon and hydrogen gases. The system thereafter stops feeding the mixed gas and conducts electron beam thermoforming after restoring the degree of vacuum to $10^{-1}$ Pa.

Other Embodiments

The methods and apparatuses according to certain aspects of the disclosure for treating a raw-material powder or producing an object are not limited to any specific configurations, forms of components, numeric conditions, or controls described in Embodiments 1 to 3. It is possible to implement these methods and apparatuses in other embodiments in which the configurations of Embodiments 1 to 3 have been partially or totally replaced with equivalent components.

The specific voltage and pressure conditions in Examples 1, 2, 3, and 4 may be adjusted according to parameters such as the size of the construction container 107, the size of the raw-material powder, and the thickness of the slice 104. For example, although in Examples 1, 2, 3, and 4 each slice 104 was subjected only to an AC voltage, the AC voltage may be superposed with a negative DC voltage to increase the velocity at collision of positive ions for enhanced heating of the slice 104. The substance used to supply hydrogen to the atmosphere in the enclosure 101 may be hydrogen gas, ammonia gas, or a non-methane hydrocarbon gas, for example.

In Embodiment 1, the proportions of hydrogen and argon gasses in the mixed gas remain constant during the application of a voltage to each slice 104 for plasma generation.

However, their proportions may be different between the initial, intermediate, and terminal stages of plasma generation.

In Embodiment 1, a resistance heater 137 is used for heating during the plasma treatment. However, heaters are not the only possible way of the heating during the plasma treatment. It is possible to pass current through the slice to generate Joule heat. The AC voltage applied to the slice 104 may be superposed with a negative bias voltage in the presence of argon gas to induce what is called sputter heating.

The examples in Embodiment 1 were ones in which an object was made from an alloy or pure metal like stainless steel or titanium, and the examples in Embodiment 2 were ones in which an object was made from a nitrided or carburized metal like nitrided stainless steel or carburized silicon. Some embodiments of the disclosure may, however, produce objects of alloys or pure metals other than stainless steel and titanium mentioned in the examples in Embodiment 1 (e.g., silicon). Alternatively, the object may be made from an oxidized metal. The plasma treatment of the raw-material oxidized-metal powder may be performed in an atmosphere that only contains an inert gas, without hydrogen, so as not to reduce the raw-material powder into pure metal.

In the examples described in Embodiment 1, a raw-material metal powder was fully melted and recrystallized in stacking solidifying regions. The heating temperatures for the treatment and laser thermoforming of the raw-material powder in Embodiment 1, however, may be chosen such that particles of the raw-material metal or oxidized metal powder, which have a high melting point, are sintered together.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2015-241005 filed Dec. 10, 2015, which is hereby incorporated by reference herein in its entirety.

What is claimed is:

1. A method for treating a raw-material powder in an object production system that uses powder bed fusion, the method comprising:

forming a first layer of the raw-material powder; and
removing oxide film formed on a surface of the raw-material powder from which the first layer has been made through chemical reduction,
wherein the removal of the oxide film is performed by generating plasma through application of an AC voltage to an electrode in contact with the first layer in an atmosphere containing hydrogen and/or an inert element.

2. The method according to claim 1 for treating a raw-material powder, wherein: in the formation of the first layer, the first layer is formed in an evacuable enclosure; and
the removal of the oxide film is performed with the enclosure evacuated to a sub-atmospheric pressure.

3. The method according to claim 2 for treating a raw-material powder, wherein the sub-atmospheric pressure is a pressure of 10 Pa or more and less than 10 kPa.

4. The method according to claim 2 for treating a raw-material powder, the method further comprising creating an atmosphere by evacuating the enclosure to a first pressure and then delivering an inert element into the enclosure to create the atmosphere of a second pressure that is higher than the first pressure and lower than atmospheric pressure.

5. The method according to any one of claim 2 for treating a raw-material powder, wherein the first layer is formed in a powder container located in the enclosure and electrically insulated from the enclosure.

6. The method according to claim 1 for treating a raw-material powder, wherein after the removal of the oxide film, a second layer is formed on the first layer.

7. The method according to claims 1a for treating a raw-material powder, wherein the generation of plasma is performed with the first layer heated using a heater or an energy beam.

8. The method according to claim 1 for treating a raw-material powder, wherein the raw-material powder is metal particles formed by water atomization.

9. A method for producing an object using powder bed fusion, the method comprising:
treating a raw-material powder by the method according to claim 1; and
shaping with a beam including solidifying, through irradiation with an energy beam, the raw-material powder from which the oxide film has been removed.

* * * * *